Figure 1:
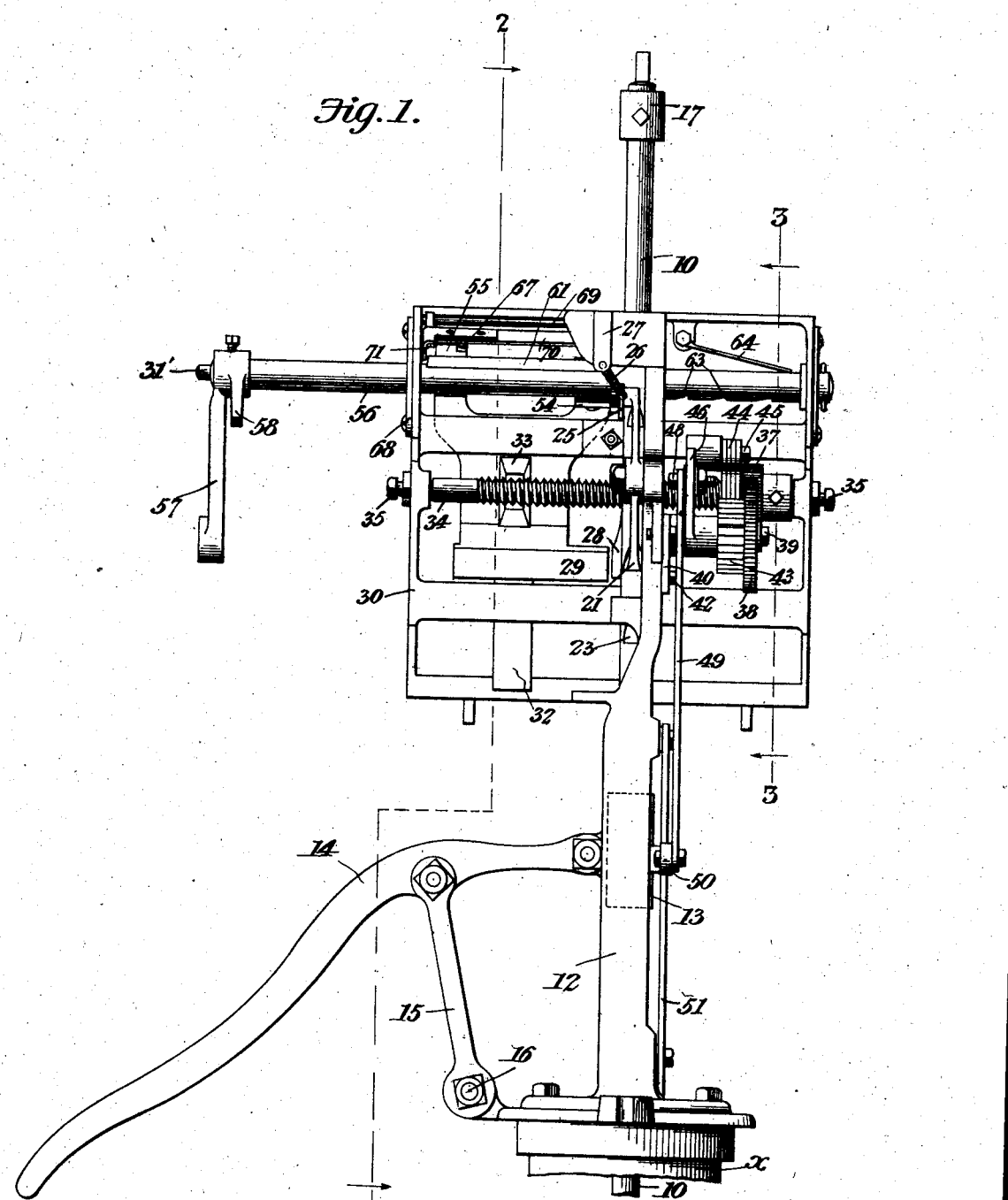

No. 834,862. PATENTED OCT. 30, 1906.
J. ALBRECHT.
LIQUID MEASURING DEVICE.
APPLICATION FILED DEC. 15, 1905.

4 SHEETS—SHEET 2.

WITNESSES:

John Albrecht INVENTOR

By C. A. Snow & Co.
ATTORNEYS

No. 834,862. PATENTED OCT. 30, 1906.
J. ALBRECHT.
LIQUID MEASURING DEVICE.
APPLICATION FILED DEC. 15, 1905.

4 SHEETS—SHEET 3.

WITNESSES:

John Albrecht INVENTOR

By C. A. Snow & Co.
ATTORNEYS

No. 834,862. PATENTED OCT. 30, 1906.
J. ALBRECHT.
LIQUID MEASURING DEVICE.
APPLICATION FILED DEC. 15, 1905.
4 SHEETS—SHEET 4.
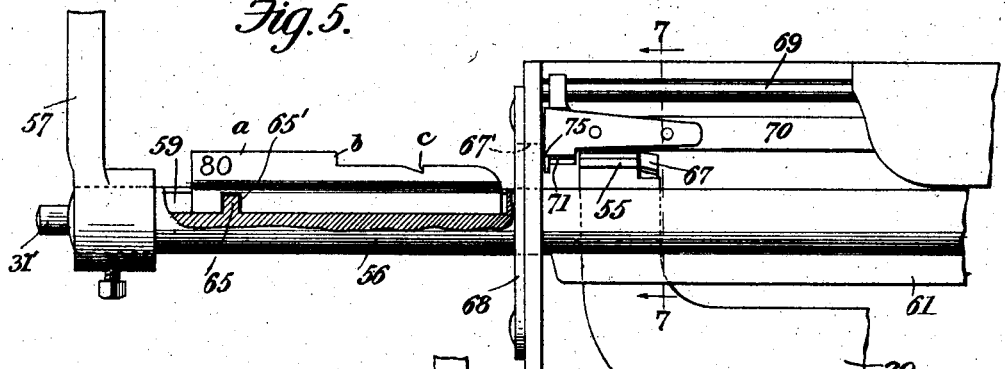
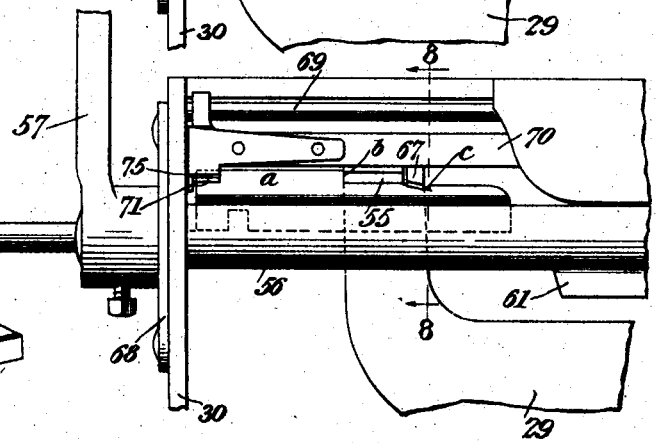
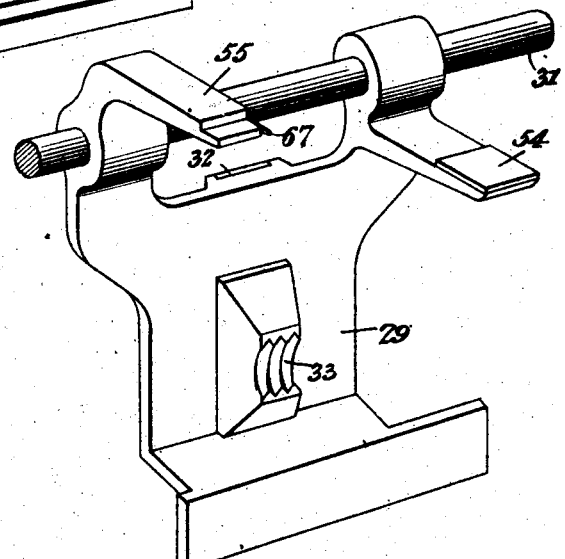
WITNESSES:
John Albrecht INVENTOR
By C. A. Snow & Co.
ATTORNEYS

UNITED STATES PATENT OFFICE.

JOHN ALBRECHT, OF ALGOMA, WISCONSIN.

LIQUID-MEASURING DEVICE.

No. 834,862.      Specification of Letters Patent.      Patented Oct. 30, 1906.

Application filed December 15, 1905. Serial No. 291,922.

*To all whom it may concern:*

Be it known that I, JOHN ALBRECHT, a citizen of the United States, residing at Algoma, in the county of Kewaunee and State of Wisconsin, have invented a new and useful Liquid-Measuring Device, of which the following is a specification.

This invention relates to liquid-measuring devices, and has for its principal object to provide a check-controlled pump or similar liquid-propelling member, the machine being arranged for the reception of checks representing different values and which will permit definite lengths of movement of the piston or other propelling member.

A further object of the invention is to provide a device of this character in which a predetermined quantity of fluid may be discharged without regard to the number or rapidity of piston-strokes or the length of such strokes, the apparatus being unlocked on the insertion of a check and locked after the piston has traveled a predetermined distance, whether such travel be effected by uniform or variable strokes.

A further object of the invention is to provide a mechanism of this character which may be readily adjusted in accordance with the diameter of the pump to which it is attached and which may be adjusted with the utmost accuracy in order to transmit correct movement from the piston or similar propelling member to the controlling devices.

A still further object of the invention is to provide a device of this type in which the piston or other member is positively locked from movement in both directions and which cannot be unlocked until a check of proper size and shape is inserted.

A still further object of the invention is to provide a device of this type in which a check after partial insertion is locked and cannot be withdrawn, so that fraudulent use of the device is prevented.

A still further object of the invention is to provide a device of this type in which after the insertion of a check and the adjustment of the parts for the delivery of liquid it will be impossible to introduce another check until the parts have again been locked after the delivery of such liquid.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 2:
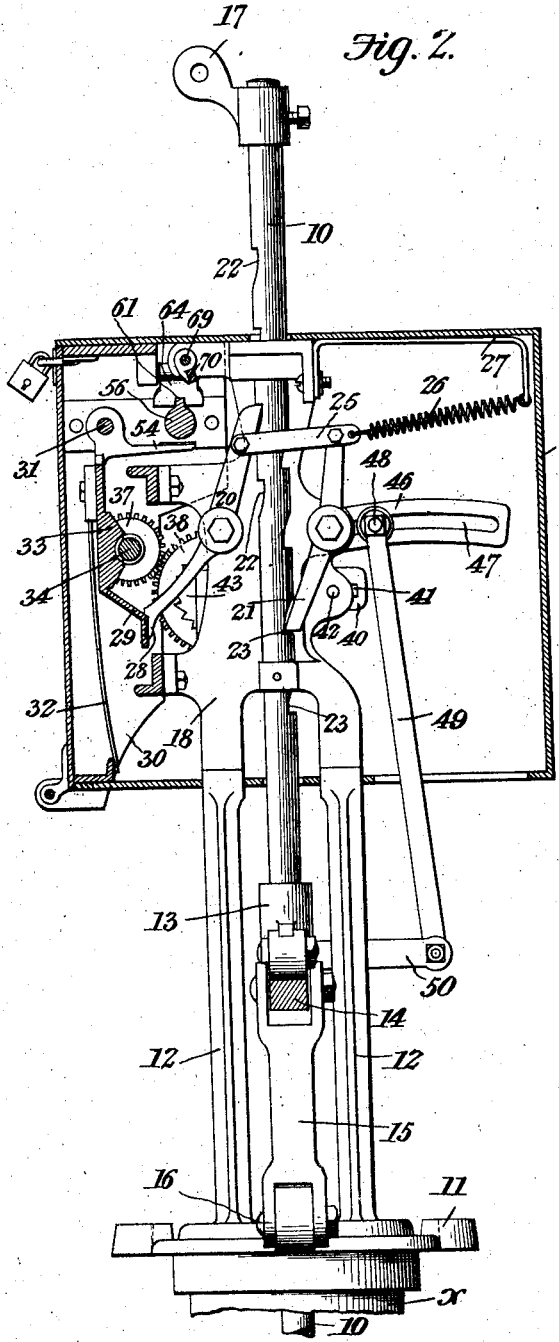
Figure 3:
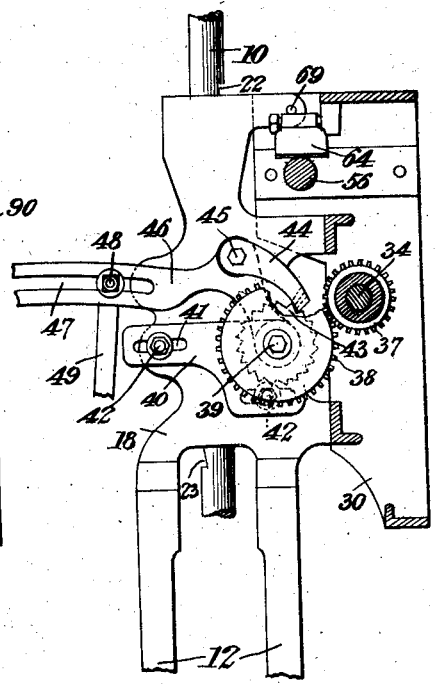
Figure 11:
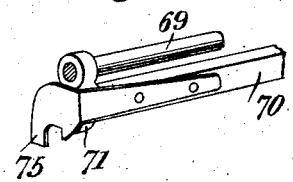
Figure 4:
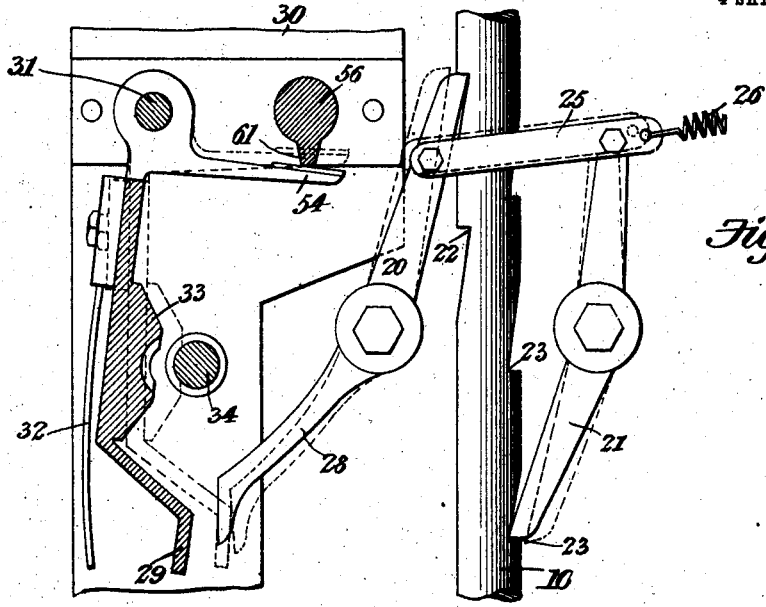
Figure 7:
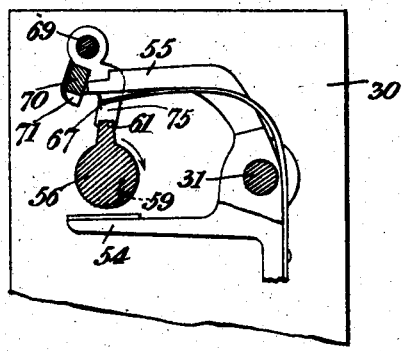
Figure 8:
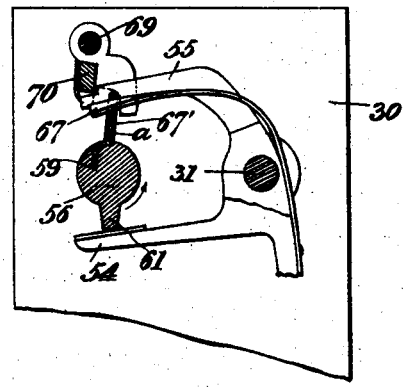
Figure 9:
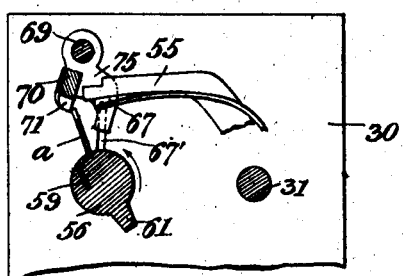

In the accompanying drawings, Figure 1 is an elevation of a liquid-measuring device constructed in accordance with the invention. Fig. 2 is a transverse sectional elevation of the same on the line 2 2 of Fig. 1. Fig. 3 is a similar view on the line 3 3 of Fig. 1. Fig. 4 is a view of a portion of the mechanism shown in Fig. 2, drawn to an enlarged scale and illustrating the piston-rod-locking devices in engaging position in full lines and in disengaged position in dotted lines. Fig. 5 is a detail elevation, partly in section, showing the check-introducing mechanism, the parts being shown in the position assumed immediately before the check is inserted. Fig. 6 is a similar view showing the check fully inserted. Fig. 7 is a transverse sectional view on the line 7 7 of Fig. 5, the check-carrying bar, however, being shown in a different position, being the position assumed after the delivery of a predetermined quantity of fluid when the parts have been automatically locked. Fig. 8 is a similar view on the line 8 8 of Fig. 6, showing the check in position. Fig. 9 is a view similar to Fig. 8, showing the manner in which the check serves to release a portion of the initial locking devices. Fig. 10 is a detail perspective view of the releasing-plate detached. Fig. 11 is a similar view of a portion of the bar which holds the releasing-plate inoperative until the check moves to discharge position. Figs. 12 and 13 are detail perspective views of checks of different value, which may be employed for adjusting the releasing device.

Similar numerals of reference are employed to indicate corresponding parts throughout the several figures of the drawings.

The cylinder $x$ shown in the present instance may form part of any ordinary construction of pump and may be provided with a piston or plunger, the operating-rod of which is shown at 10, and as this rod is reciprocated the liquid within the cylinder is moved and may be discharged into a suitable vessel or to any given point. The present mechanism is designed to control the extent of movement of the piston-rod and in so doing to control the quantity of liquid moved or delivered.

The upper head 11 of the cylinder is provided with suitable standards 12, forming a support for the controlling mechanism, and secured to the piston-rod and supported between such standards is a collar 13, that is connected to one end of an operating-lever 14, the latter being fulcrumed on a link 15, which is pivoted at its lower end to a bolt 16, carried by the head of the cylinder. This mechanism is designed to show an operating means for the piston-rod, but the operating means may be attached above the controlling mechanism, a suitable attaching-collar 17 being shown at the top of the piston-rod in Figs. 1 and 2 for this purpose.

Secured to or formed integral with the standards is an upper frame 18, to which is pivoted a pair of locking-pawls 20 and 21, that are arranged to engage in notches 22 and 23, formed in the opposite sides of the piston-rods, the engaging end of the pawl 20 being directed upward and the engaging end of the pawl 21 being directed downward, while the notches are equidistant and so arranged that both pawls may move to locking position at the same time and prevent any movement of the piston-rod in either direction. The upper end of the pawl 20 is connected to the tail of the pawl 21 by a link 25, said link being connected by a helical tension-spring 26 to the outer end of a bracket 27, that is supported by the frame, the spring tending constantly to move both pawls to locking position. The tail of the pawl 20 is formed by an arm 28, which may be engaged by a pivotally-mounted plate 29 in order to move both pawls to release position. When moved from engagement with the arm, both pawls are forced to locking position by the spring 26. The check-controlled mechanism hereinafter described is designed to control the movement of the plate 29 to and from the arm 28 and the length of time with which it remains in engagement with said arm 28, this being determined by the character of the check inserted, said checks representing different values and each controlling the delivery of a different amount of liquid.

Secured to the frame 18 is an open rectangular frame 30, which carries a horizontally-disposed rod 31, to which the upper end of the plate 29 is pivoted and on which it is free to slide in the direction of the length of the bar. The lower end of this plate projects inward and is arranged to engage with the arm 28 of pawl 20, as previously described, and said plate is operated upon by a spring 32, that normally impels it in the direction of said arm, the stress of spring 32 being much greater than the stress of the spring 26. The plate 29 carries a half-nut 33, that is arranged to engage with the threads of a screw-shaft 34, having suitable bearings formed by the conical ends of screws 35, that extend through threaded openings formed in the end portions of the frame 30. On the shaft 34 is secured a pinion 37, with which engages a pinion 38, that is carried by a stud-shaft 39, projecting from a carrying-plate 40. This plate has a pair of slots 41, arranged for the passage of locking screws or bolts 42, that extend into threaded openings formed in the frame 18, and the position of the plate may be adjusted in accordance with the diameter of the gear-wheel 38, so that gears of any size may be employed to mesh with the pinion 37 in accordance with the diameter of the cylinder or other pump dimensions which control the quantity of fluid discharged.

Secured to the gear-wheel 38 is a ratchet-wheel 43, with which engages a series of stepped pawls 44, mounted on a pin 45, that is carried by a lever 46, fulcrumed on the stud 39. The outer end of the lever 46 is provided with an arcuate slot 47, in which is mounted an adjustable bolt 48, that may be moved to any point in the length of the slot and locked therein. To this bolt is connected the upper end of a link 49, and the lower end of said link is connected to a rod 50, that is rigidly secured to the collar 13, and as the collar reciprocates with the piston-rod movement will be imparted, through the lever 46 and the pawls 44, to the ratchet-wheel 43, and from thence, through the gear 38, to the pinion 37, turning shaft 34 and moving the plate 29 endwise of its carrying rod or bar 31. The arm 50 is arranged to extend between one of the standards 12 and an auxiliary strap 51, that is slightly spaced from the standard, the guide thus formed serving to prevent rotative movement of the piston-rod and holding the notches of the latter in proper position to be engaged by the locking-pawls.

It may here be remarked that when a check is inserted the plate 29 is moved toward the right of Fig. 1, its nut 33 being then clear of the threads of shaft 34 the distance corresponding to the value of the check inserted, after which the plate is allowed to move under the influence of spring 32 until the half-nut engages the shaft and the lower end of the plate engages the arm 28 and moves both pawls to release position. The piston-rod is then operated and the fluid is pumped, and during the reciprocatory movement of the piston-rod movement is transmitted, through the pawl-and-ratchet mechanism just described, to the gear 38 and pinion 37, the shaft 34 being revolved, and as said shaft is then in engagement with the nut 33 the plate 29 will be moved to the left and will continue to move until its end passes beyond the arm 28, whereupon spring 26 will again move both pawls into locking engagement with the piston-rod and prevent further movement of the latter in either direction.

The plate 29 is provided with two forwardly-extending arms, one of which, 54, is arranged at the right-hand end and is below the horizontal plane of the rod 31, while the other, 55, is arranged at the left-hand end and is disposed above the plane of the rod 31.

The arm 54 is arranged immediately below a longitudinally-slidable and revolubly-mounted check-carrying rod 56, that extends through suitable bearing-openings formed in the opposite end plates of the rectangular frame 30 and at one end is provided with a weight-operating handle 57, from which projects an arm 58, that is practically at a right angle to the plane of the handle and is arranged to engage with a stop 31', arranged parallel with the rod 56 and forming in the present instance an extension of the rod 31. The stop-arm 58 limits the movement of the handle 57 in order to hold the rod in check-receiving position—that is to say, with its check-receiving slot 59 uppermost, as shown in Figs. 5 and 8. When the device is in operation, the wieghted handle is below the rod, as shown in Fig. 1, and remains in this position in order to prevent the rod interfering with the movement of other portions of the apparatus.

Projecting from the rod 56 is an elongated flange or rib 61, which when moved into engagement with the arm 54, as shown in Fig. 4, will move the nut 33 of plate 29 out of engagement with the threaded shaft 34, and the parts are in this position when a check is inserted, as will be observed on reference to Figs. 5 and 8, it being necessary to free the nut from the shaft in order that the plate may be moved to the right a distance corresponding to the value of the check inserted. In that face of the rod opposite the flange or rib 61 are notches 63, that are engaged by a locking-pawl 64, which will prevent outward movement of such rod after its inward movement has commenced and while the rod is retained in the position shown in Figs. 4 and 8. When the rod is turned and the handle lowered to vertical position below the rod, as shown in Fig. 1, the notches are moved out of alinement with the pawl, and said rod is then free for movement in any direction.

The slot 59, formed in the rod 56, is designed for the reception of a check $a$, and the position of the check is determined by a small lug 65 in the lower wall of the check-receiving slot and a notch 65', that is formed in the lower face of the check for the reception of said lug. Each check has an introducing end and is provided with a shoulder $b$, the distance of which from the rear or outer end of the check determines the value of said check, and this shoulder is designed to engage the arm 55 of plate 29 and to move said arm and plate a distance corresponding to the value of the check, the greater the distance between the rear end of the check and the shoulder the greater the distance which the piston may travel after being unlocked and before the parts can assume locking position. The arm 55 also carries a spring locking-pin 67, that is designed to engage in a notch $c$, formed in the check, at about the time the shoulder $b$ engages with the arm 55, so that when the check reaches its operative position it will be locked and cannot be withdrawn from the machine.

The checks are inserted through a suitably-shaped opening 67', formed in an escutcheon 68, that is secured to the frame 30, and must be forced wholly within the inner wall of the frame before they can become effective in unlocking the piston-rod.

At a point above the rod 56 the frame is provided with supports for a rod 69, extending parallel with the rod 56 and carrying a pendent locking-bar 70, that is free to swing on the rod 69. This locking-bar 70 extends over the top of the arm 55, and so long as said arm remains in engagement with the bar it will be impossible for the plate 29 to move a distance sufficient to bring the half-nut 33 in engagement with the shaft 34, and until this is done it is impossible for the plate 29 to move a distance sufficient to unlock the pawls. This bar 70 is provided at that end adjacent to the check-opening 67' with a pendent flange 71, which is designed to be engaged by the check after the latter is introduced wholly within the lines of the frame, and after the check has been so introduced the rod 56 is turned in the direction indicated at the arrows in Figs. 8 and 9, so that said check will engage with the flange 71 and pull or move the bar 70 outward beyond the end of the arm 55, allowing the latter to move up as plate 29 moves under the influence of spring 32, whereupon the plate being free moves forward until the nut 33 engages the threaded shaft 34 and the lower end of the plate engages the arm 28 and moves both of the pawls 20 and 21 to release position.

Secured to the end of the bar 70 is a plate 75, which is arranged to cover the check-receiving opening when the bar is moved to the position shown in Fig. 9 and remains over said opening to prevent the introduction of another check until the full amount of liquid has been pumped and the parts have again assumed the position shown in Fig. 8.

In the operation of the device the parts normally assume the position shown in Figs. 1, 2, and 3 after the pumping operation has been completed, and it will be observed that the pawls 20 and 21 are in locking engagement with the recesses of the piston-rod, while the arm 28 of pawl 20 is beyond the end of the plate 29, the latter at this time being forward with its half-nut 33 engaged with the shaft 34, and as said shaft can no longer be turned through its operating mechanism, owing to the locking of the piston-rod, the plate cannot be moved in either direction. At this time the flange or rib 61 of the rod 56 is uppermost, as shown in Figs. 1 and 2, and the handle 57 is hanging down below the rod.

To operate the device, the rod 56 is drawn outward to its fullest extent—as shown, for instance, in Fig. 1—and then said rod is turned by means of its operating-handle until the arm 58 engages the stop 31', the check-receiving slot 59 being moved to the top of the rod, as shown in Figs. 5, 6, and 8. This turning of the rod brings the flange or rib 61 down against the arm 54 of the plate 29, and the arm is depressed, while the plate is swung rearward, and its nut 33 being moved out of engagement with the threaded shaft 34, and at the same time the arm 55 moves downward a trifle, so that it will not be in frictional engagement with the bar 70. A check is then inserted, and the rod is pushed inward, carrying the check through the opening 67' until the shoulder $b$ of the check engages the edge of the arm 55 and the finger 67 enters the locking slot or notch $c$ of the check. During the further inward movement of the rod the arm 55 and the plate 29 are moved toward the right, Figs. 1 and 6, a distance corresponding to the value of the check, and when the check is fully inserted the parts are in the position shown in Figs. 4, 6, and 8. The rod 56 is now turned and in turning the rib 61 of the rod moves away from the arm 54, and at the same time the check engages with the flange 71 of the bar 70, swinging said bar 70 outward beyond the forward edge of the arm 55, as shown in Fig. 9. This allows both arms 54 and 55 to rise and the lower portion of the plate 29 to swing forward until the half-nut 33 engages the threads of the shaft 34 and the lower portion of the plate engages the arm 28 and moves both of the pawls 20 and 21 to release position. The rod 56 is turned until the check falls from the receiving-slot in said rod by gravity to a point within the frame, and then the bar 70 falls back against the forward end of the arm 55 and remains in that position with the plate 75, covering a portion of the check-receiving opening 67', preventing the introduction of another check. The piston-rod is then reciprocated, and the liquid is discharged by the movement of the piston, the reciprocation of the rod being either fast or slow and the swing being regular or variable, as desired. The movement is transmitted through the link 49 and arm 46 to the pawl 44 and thence through ratchet-wheel 43 and gear 38 to the pinion 37, turning the shaft 34, and shaft 34, engaging with the half-nut 33, moves the plate 29 toward the left the distance which the plate moves at each stroke, being in direct proportion to the length of that stroke. The parts continue in this position until the end of the plate 29 has passed beyond the end of the arm 28, whereupon the spring 26 instantly draws the two pawls 20 and 21 to locking position, and the movement of the piston-rod is stopped. The parts are thus readjusted to the initial position and cannot be again operated until rod 56 is drawn out and turned until its check-receiving slot is uppermost, as before described.

The controlling mechanism is arranged within a suitable casing 90, preferably provided with a suitable lock, so that the mechanism cannot be tampered with, and the inserted checks may be retained.

I claim—

1. In a device of the class described, a piston-rod or similar member, means for locking the same, a releasing device movable variable distances in accordance with the contour of a controlling-check, and means operable from the piston-rod for returning said releasing device to initial position after the piston-rod has traveled a predetermined distance.

2. In a device of the class described, the combination with a piston-rod or similar member, of an automatic locking means for the rod, and a check-controlled means for engaging and releasing the locking means and holding the same released during a predetermined length of movement of the rod, the check-controlled means being movable different distances in accordance with the contour of the checks inserted.

3. In a device of the class specified, the combination with a piston-rod or similar member, of means for locking the rod from movement, and a releasing device serving to engage the locking means, said releasing device being manually moved in one direction by an inserted check, and being constructed to be connected to the piston-rod for movement in the opposite direction.

4. In a device of the class described, the combination with a piston-rod or similar member, of means for engaging the rod and positively locking the same from movement in both directions, a manually-operated check-controlled releasing device arranged to engage with such locking means, and a piston-rod-actuated returning means with which said releasing device engages as it moves the locking device to release position.

5. In a device of the class described, a piston-rod having notches in its opposite faces, a pair of pawls arranged to enter said notches and lock the rod from movement in either direction, a check-controlled releasing device for moving said pawls to release position, and means for restoring the releasing device to initial position.

6. The combination with a notched piston-rod, of a pair of oppositely-directed pawls for engagement therewith, a link connecting the pawls, a spring tending to move said pawls to operative position, a check-controlled releasing device for engaging said pawls, and means for restoring said releasing device to initial position.

7. In a device of the class specified, the combination with a notched piston-rod, of a locking-pawl having a projecting arm, a check-adjusted plate arranged to engage said arm to effect release of the pawl, a half-nut carried by the plate, a screw with which said nut moves into engagement when the pawl is released, and means for transmitting movement from the piston-rod to the screw.

8. In a device of the class described, the combination with a piston-rod, of a locking member, a releasing-plate movable into engagement with said locking member, said plate being arranged to receive movement from inserted checks, a half-nut carried by the plate, a screw with which said nut moves into engagement, and means for transmitting movement from the piston-rod to the screw.

9. In a device of the class described, the combination with a piston-rod, of a piston-rod-locking member, a check-actuated plate arranged to engage said locking member, a nut carried by the plate, a screw with which said nut moves into engagement as the plate moves to release position, and mechanism operable from the piston-rod for transmitting to the screw a movement proportioned to the extent of movement of the rod.

10. In a device of the class described, the combination with a piston-rod, of a piston-rod-locking member, a check-adjusted releasing-plate for engaging the locking member, a half-nut carried by the plate, a screw with which said nut engages as the plate moves to release the locking member, a pinion carried by the screw, a gear intermeshing with said pinion, a stud-shaft carrying the gear, an adjustable support carrying said stud-shaft and arranged to permit the employment of gears of different size for mesh with the pinion, and means for transmitting movement to said gear.

11. In a device of the class described, the combination with a piston-rod, of a rod-locking member, a check-adjusted plate for engaging said locking member and moving the same to release position, a half-nut carried by the plate, a screw-shaft with which said nut engages as the plate moves to release position, a pinion carried by the shaft, a gear intermeshing with said pinion, a ratchet-wheel connected to the gear, a pawl engaging said ratchet-wheel, a pawl-carrying lever, and means for connecting said lever to the piston-rod.

12. In a device of the class described, the combination with a piston-rod, of a rod-locking member, a check-adjusted plate for engaging said locking member and moving the same to release position, a half-nut carried by the plate, a screw-shaft with which said nut engages as the plate moves to release position, a pinion carried by the shaft, a gear intermeshing with the pinion, a ratchet-wheel connected to the gear, a pawl engaging said ratchet-wheel, a pawl-carrying lever provided with an arcuate slot, a collar extending from the piston-rod and provided with a guiding-arm, and a link connecting said arm to the pawl-carrying lever.

13. In a device of the class described, the combination with a piston-rod or similar member, of a rod-locking means, a pivotally-mounted slidable plate constituting a releasing device, a half-nut carried by the plate, a screw-shaft with which said nut engages, means for turning the shaft for restoring the plate to initial position, and a check carrying and inserting member arranged to move said plate and effect disengagement of the nut from the screw prior to the introduction of a check.

14. In a device of the class described, the combination with a piston-rod or similar member, of a rod-locking device, a releasing member, a half-nut carried thereby, a screw with which the nut engages, means operable from the rod for revolving the screw, a check-inserting rod having a receiving-slot for the check, and a cam carried by said rod and serving to disengage the releasing member from the screw as the rod moves to check-inserting position.

15. In a device of the class described, the combination with a piston-rod or similar member, of a locking means therefor, a releasing device, means for restoring the releasing device to released position, a casing having an opening for the passage of a check, a check-inserting member having a slot to receive a portion of the check, and means operable on adjustment of said member to bring the slot and opening into alinement for disengaging the releasing member from its restoring means.

16. In a device of the class described, the combination with a piston-rod or similar member, of a locking means therefor, a releasing device movable into engagement with said locking means, a check carrier and inserting member movable to force the check into engagement with the releasing means, and to transmit movement thereto to an extent proportioned to the contour of the check, and means operable on movement of the carrier to check-discharging position for permitting the releasing device to engage the locking member.

17. In a device of the class described, a locking member, a releasing device therefor, a check carrying and inserting member arranged to transmit movement to the releasing device through the intervention of the check, and means actuated by the check during movement to discharge position for preventing the movement of the releasing device into operative relation with the locking device.

18. In a device of the class described, the combination with a piston-rod or similar member, of a locking device therefor, a releasing means, a check - carrier serving through the intervention of the check to adjust the releasing means, and a movable locking-bar disposed in the path of movement of the check for holding the releasing means from operative movement until the check is discharged.

19. In a device of the class described, the combination with a piston-rod or similar member, of a locking device therefor, a releasing means, a slidable and revoluble rod having a check-receiving slot, and provided with a cam for engaging the releasing means as the rod is turned to check-receiving position, said rod serving through the intervention of the check to adjust the releasing device to a position determined by the contour of the check, an automatic lock for holding the releasing device in inoperative position after the check is inserted, said locking device being arranged to be engaged by the check, and released as the check moves to discharge position.

20. In a device of the class described, the combination with a piston-rod, or similar member, of a locking device therefor, a pivotally mounted and slidable releasing-plate arranged to engage said locking device, upper and lower arms projecting from the plate, a half-nut carried by the plate, a screw with which said nut may engage, means for transmitting movement from the piston-rod to the screw, a check carrying and inserting rod having in one face a slot for the reception of a check and provided at its opposite face with a rib or flange for engaging the lower rim of the plate and moving said plate from engagement with the locking device, and a pivotally-mounted locking-bar normally engaging the second arm and holding the releasing device in inoperative position, said locking-bar being disposed in the path of movement of the check as the check-carrying rod is turned to discharge position.

In testimony that I claim the foregoing as my own I have hereto affixed my signature in the presence of two witnesses.

JOHN ALBRECHT.

Witnesses:
  JOHN B. GIGAH,
  EDWARD O'NEIL.